(12) United States Patent
Senge et al.

(10) Patent No.: US 8,100,458 B2
(45) Date of Patent: Jan. 24, 2012

(54) CENTRING PIN

(75) Inventors: Christoph Senge, Dillingen (DE); Massimiliano Mosca, Turin (IT)

(73) Assignees: Pilkington Automotive Deutschland GmbH, Witten (DE); Pilkington Italia S.p.A., San Salvo (IT)

( * ) Notice: Subject to any disclaimer, the term of this patent is extended or adjusted under 35 U.S.C. 154(b) by 0 days.

(21) Appl. No.: 12/739,374

(22) PCT Filed: Oct. 24, 2008

(86) PCT No.: PCT/EP2008/064440
§ 371 (c)(1), (2), (4) Date: Jul. 20, 2010

(87) PCT Pub. No.: WO2009/053463
PCT Pub. Date: Apr. 30, 2009

(65) Prior Publication Data
US 2010/0320806 A1    Dec. 23, 2010

(30) Foreign Application Priority Data
Oct. 24, 2007 (EP) .................................... 07119219

(51) Int. Cl.
*B60J 1/00* (2006.01)
(52) U.S. Cl. ...................................................... 296/84.1
(58) Field of Classification Search .................. 296/191, 296/218, 146.2, 146.15, 84.1; 52/204.5; 156/108
See application file for complete search history.

(56) References Cited

U.S. PATENT DOCUMENTS

| 4,181,061 A | 1/1980 | McSherry |
| 5,707,473 A | 1/1998 | Agrawal et al. |
| 6,209,946 B1 | 4/2001 | Eng |
| 6,224,136 B1 | 5/2001 | Takagi |
| 6,460,917 B2 | 10/2002 | De Paoli |
| 2006/0157890 A1 | 7/2006 | Amano et al. |

FOREIGN PATENT DOCUMENTS

| CA | 2 273 245 A1 | 5/1999 |
| DE | 196 49 762 A1 | 6/1998 |
| GB | 1 591 912 A | 7/1981 |
| JP | 61-249812 A | 11/1986 |
| WO | WO 98/24649 | 6/1998 |
| WO | WO 99/58355 A1 | 11/1999 |
| WO | WO 2005/113989 A1 | 12/2005 |

OTHER PUBLICATIONS

International Search Report issued by the European Patent Office on Jan. 23, 2009 as the International Searching Authority in International Application No. PCT/EP2008/064440.
European Search Report issued by the European Patent Office on Jan. 7, 2001 in European Patent Application No. EP 07 11 9219.

*Primary Examiner* — Lori Lyjak
(74) *Attorney, Agent, or Firm* — Buchanan Ingersoll & Rooney PC (57) ABSTRACT

A vehicle glazing having a centring pin bonded thereto, and a centring pin suitable for a vehicle glazing are disclosed. The centring pin comprises a base portion bonded to the vehicle glazing and a centring portion adapted to be inserted into a hole in the bodywork of a vehicle. The centring portion is joined to the base portion, and moveable between a lowered position, in which the glazing may be stored, and a raised position, in which the glazing may be fitted into an aperture in a vehicle.

31 Claims, 5 Drawing Sheets

CENTRING PIN

The present invention relates to a centring pin suitable for centring a glazing within an aperture in a vehicle, in particular, a centring pin bonded to a surface of a glazing.

Fixed vehicle glazings, such as a windscreen, a sidelight or a backlight, are generally provided with centring pins to aid in positioning the glazing when being installed in an aperture in a vehicle. Such centring pins come in a variety of forms, and may be used purely as a positioning aid, or may provide a measure of temporary fixation, holding a glazing in place during the installation process whilst an adhesive cures. Centring pins are typically bonded to one surface of a glazing, either directly to the glass, or to a black ceramic print region known as an obscuration band. When a glazing is installed, the centring pins are inserted into holes or gaps in the vehicle bodywork as the glazing is pushed into place. The pins are positioned on the glazing such that if all pins engage with the corresponding holes in the vehicle bodywork, the glazing has been positioned correctly.

US 2006/0157890 A1 discloses a number of different types of pyramid-shaped centring pins that may also be used to temporarily fix a glazing into place. The pins themselves are bonded to a surface of the glazing, either using a liquid adhesive, or by being moulded into a profiled gasket around the periphery of the glazing. U.S. Pat. No. 5,707,473 discloses a centring pin that may be used to both position and mount a glazing within an aperture in a vehicle. The pin comprises a head, bonded to a ceramic print on the glazing by an adhesive, and a shaft having a screw-thread. The shaft passes through a hole in the vehicle bodywork, and engages with a nut. The nut is threaded onto the shaft until it abuts the vehicle bodywork, firmly holding the glazing in place.

Even though the types of centring pins disclosed in the above documents differ, each pin has one design element in common. Each type of pin is fixed to the glazing in a position where it projects upwards at right-angles from the surface of the glazing. Typical centring pins are of the order of 20 mm in height, which places a constraint on how closely glazings with pins mounted thereon can be placed together when packed for transportation. By requiring additional space for the pins, the number of glazings that can be transported in a single rack is reduced compared with glazings having no attachments at all. Consequently, the transportation costs of such glazings are increased compared with those for opening glazings where centring pins are not usually required.

It would be desirable to use a design of pin that preserved the centring and fixing functions of known centring pins, but which requires a smaller space above the glazing once mounted thereon, enabling the reduction of transportation costs.

The present invention aims to address these problems by providing a vehicle glazing having a centring pin bonded thereto, the centring pin comprising a base portion bonded to the vehicle glazing and a centring portion adapted to be inserted into a hole in the bodywork of a vehicle, the centring portion being joined to the base portion, and moveable between a lowered position, in which the glazing may be stored, and a raised position, in which the glazing may be fitted into an aperture in a vehicle.

By providing a centring pin having a centring portion that is moveable, it is possible to transport a vehicle glazing with the centring portion in a lowered position, thereby reducing the amount of space required by the glazing when packed. By reducing the amount of space each glazing requires, it is possible to transport more glazings in the same space than previously. This reduces costs and gives environmental benefits, as the volume to be transported is reduced, and fewer truck journeys are required to deliver finished glazings.

Preferably, the centring portion of the centring pin is rotatably mounted on the base portion of the centring pin by means of a pivot, and wherein in the lowered position, the centring portion is substantially parallel with the base portion and in the raised position the centring portion is substantially perpendicular to the base portion. The base portion and the centring portion of the centring pin may comprise locking means that act to lock the centring portion into the raised position. Preferably the locking means comprise a pair of opposing cuboid protrusions on the base portion adapted to engage with corresponding square recesses on the centring portion.

The centring portion of the centring pin may comprise a cavity having two side walls in the base of the centring portion sized to receive and overlap the base portion. The pivot may comprise opposing circular holes in the side walls of the cavity each having a cylindrical protrusion on the base potion inserted therein.

Alternatively, the base portion and the centring portion of the centring pin may be joined by a strip of flexible material. In this case, when in the raised position, the centring portion and the base portion of the centring pin may form a truncated cone, with the base portion forming the base of the cone and the centring portion forming the upper portion of the cone. The centring portion of the centring pin may be engaged with the base portion in the raised position.

In another alternative, the centring portion of the centring pin may be extendible above the base portion of the centring pin to move between the lowered position and the raised position. In this case, the centring portion of the centring pin may be formed from a flexible material folded back upon itself in a plurality of concertina-like folds in the lowered position, or the centring portion may be formed from a plurality of concentric body portions, arranged to fit inside each other and the base portion in the lowered position. The centring portion of the centring pin may be provided with a stop region enabling a section of the centring portion to collapse when inserted into a hole in the bodywork of a vehicle.

Preferably, both the base portion and the centring portion of the centring pin are formed from a thermoplastic material. Preferably, the thermoplastic material is one of polypropylene, polyamide, glass-fibre reinforced polyamide or polyoxymethylene.

The present invention also provides a centring pin, suitable for a vehicle glazing, comprising: a base portion; and a centring portion adapted to be inserted into a hole in the bodywork of a vehicle when in a raised position, the centring portion being joined to the base portion, wherein the centring portion is moveable between a lowered position and a raised position.

Preferably, the centring portion is rotatably mounted on the base portion by means of a pivot, and wherein in the lowered position, the centring portion is substantially parallel with the base portion and in the raised position the centring portion is substantially perpendicular to the base portion. The base portion and the centring portion may comprise locking means that act to lock the centring portion into the raised position. Preferably, the locking means comprise a pair of opposing cuboid protrusions on the base portion adapted to engage with corresponding square recesses on the centring portion.

The centring portion may comprise a cavity having two side walls in the base of the centring portion sized to receive and overlap the base portion. The pivot may comprise opposing circular holes in the side walls of the cavity each having a cylindrical protrusion on the base potion inserted therein.

Alternatively, the base portion and the centring portion may be joined by a strip of flexible material. In this case, when in the raised position, the centring portion and the base portion may form a truncated cone, with the base portion forming the base of the cone and the centring portion forming the upper portion of the cone. The centring portion may be engaged with the base portion in the raised position.

In another alternative, the centring portion may be extendible above the base portion to move between the lowered position and the raised position. In this case, the centring portion may be formed from a flexible material folded back upon itself in a plurality of concertina-like folds in the lowered position. The centring portion may be formed from a plurality of concentric body portions, arranged to fit inside each other and the base portion of the centring pin in the lowered position. The centring portion may be provided with a stop region enabling a section of the centring portion to collapse when inserted into a hole in the bodywork of a vehicle.

Preferably, both the base portion and the centring portion are formed from a thermoplastic material. More preferably, the thermoplastic material is one of polypropylene polyamide, glass-fibre reinforced polyamide or polyoxymethylene.

The invention will now be described by way of example only, and with reference to the accompanying drawings in which.

Figure 1:
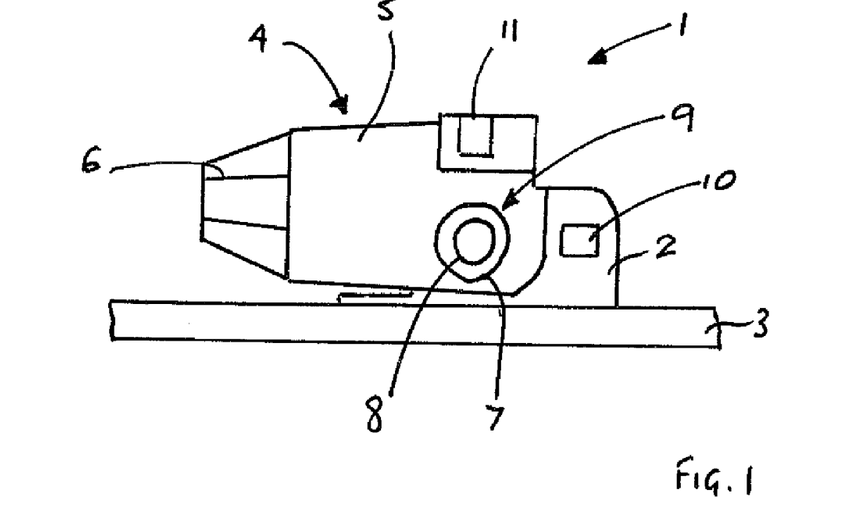
FIG. 1 is a schematic side-view of a centring pin in accordance with the present invention, in a lowered position.

FIG. 1 is a schematic side-view of a centring pin in accordance with a first embodiment of the present invention, in a lowered position, in which a glazing may be stored. The centring pin 1 comprises a base portion 2, adhered to a ply of glass 3 by an adhesive (not shown), and a centring portion 4, having a generally frusto-conical shape comprising a cylindrical base section 5 and a truncated cone top section 6. The centring portion 4 also comprises a cavity having two side walls (not shown) in the base portion 5 sized to receive and overlap the base portion 2. The cavity has a pair of opposing circular holes 7 in the side walls each of which receive a cylindrical protrusion 8 on the base portion 2, such that the centring portion 4 clips over the base portion 2. The holes 7 and protrusions 8 form a pivot 9 that allows the centring portion 4 to rotate between a lowered position and a raised position, as discussed in more detail below. The base portion 2 and centring portion 4 also comprises locking means that allow the centring portion 4 to be locked into the raised position for use in fitting a glazing into an aperture of a vehicle. The locking means comprise a pair of opposing cuboid protrusions 10 that engage with corresponding square recesses 11 on the base section 5 of the centring portion 4. The protrusions 10 are provided with sloping upper surfaces to enable the centring portion 4 to be slid easily over the protrusions 10 during rotation. This is shown in more detail in FIG. 5. In addition, the base section 5 of the centring portion 4 is provided with a rounded edge, to help smooth the rotation of the centring portion 4 by creating a surface that slides against the base portion 2.

Figure 2:
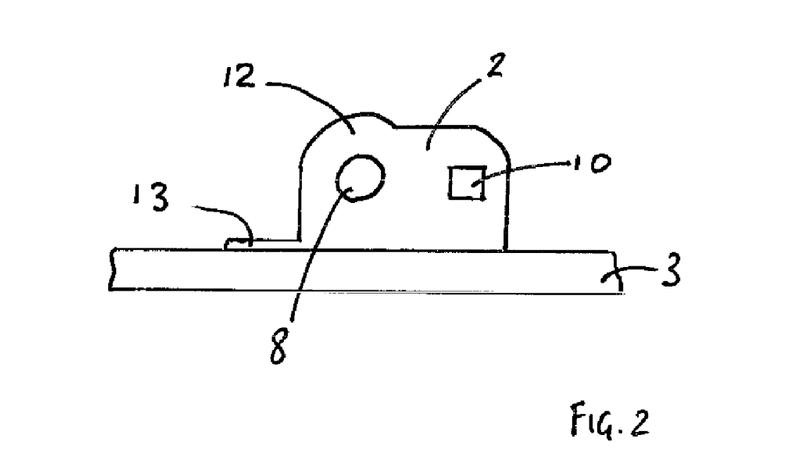
FIG. 2 is a schematic side-view showing the base portion of the centring pin of FIG. 1.
Figure 4:
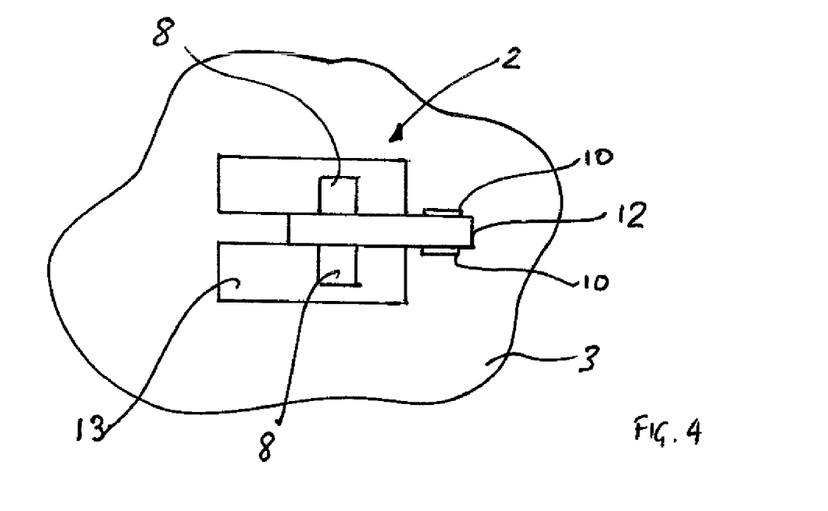
FIG. 4 is a schematic plan-view of the base portion of the centring pin of FIG. 1.

FIGS. 2 and 4 show the base portion 2 in greater detail. FIG. 2 is a schematic side-view, and FIG. 4 is a schematic plan-view, showing the base portion of the centring pin of FIG. 1. The base portion comprises a main body 12 and a support 13 that extends beyond the main body 12 of the base portion 2 and the base section 5 of the centring portion 4 when in the raised position. The support 13 gives stability to the centring pin 1 in use, and provides an increased surface area for the application of adhesive or positioning within a gasket to bond the centring pin 1 to the glass 3. The cylindrical 8 and cuboid protrusions 10 are located on the main body 12 of the base portion 2 at the same height above the glass 3, and distributed evenly on the main body 12 to provide stability for the centring pin 1 when in use.

Figure 3:
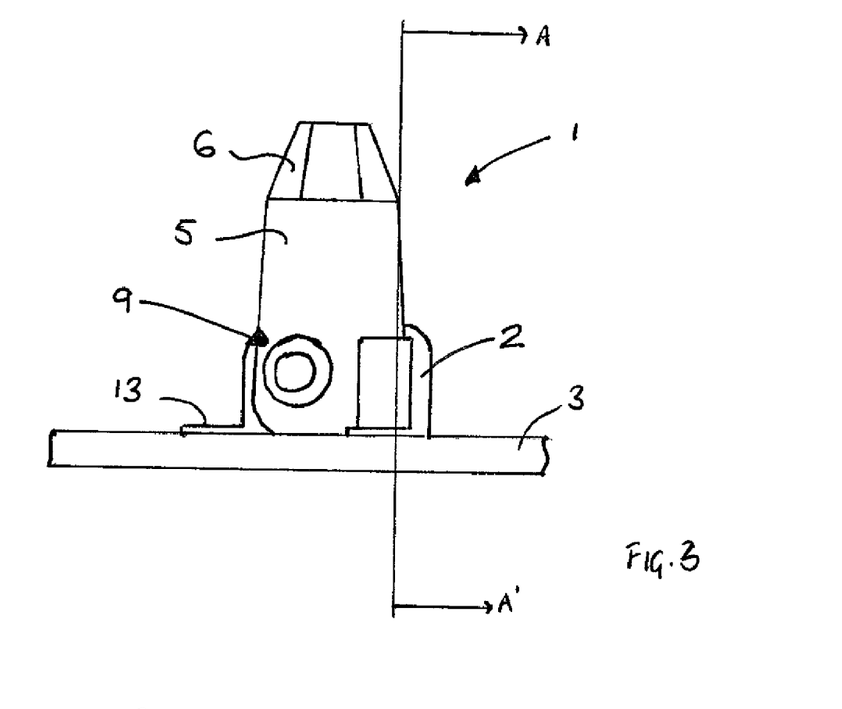
FIG. 3 is a schematic side-view of the centring pin of FIG. 1 in a raised position.

FIG. 3 is a schematic side-view of the centring pin of FIG. 1 in a raised position. In order to place the centring pin 1 into the raised position, the centring portion 4 is rotated about the pivot 9. When the centring pin 1 is in the lowered position, the centring portion 4 lies substantially parallel with base portion 2 and the surface of the glass 3. In the raised position, the centring portion 4 is substantially perpendicular to the base portion 2 and the glass 3, so that the angle between the base portion 2 and the centring portion 4 is substantially 90°. When the centring portion 4 is rotated, at an angle of approximately 75° with the base portion 2, the square recesses 11 begin to slide over the sloped surfaces of the cuboid protrusions 10. As the centring portion 4 approaches an angle of 90° with the base portion 2, the cuboid protrusions 10 and square recesses 11 fully engage, locking the centring portion 4 into place. Once the centring pin 1 is in the raised position, it may be used in the same manner as conventional centring pins. The general conic-frustum shape of the centring portion 4, in particular, the truncated cone section 6 enables the centring pin 1 to be slid easily through locating holes in vehicle bodywork.

Figure 5:
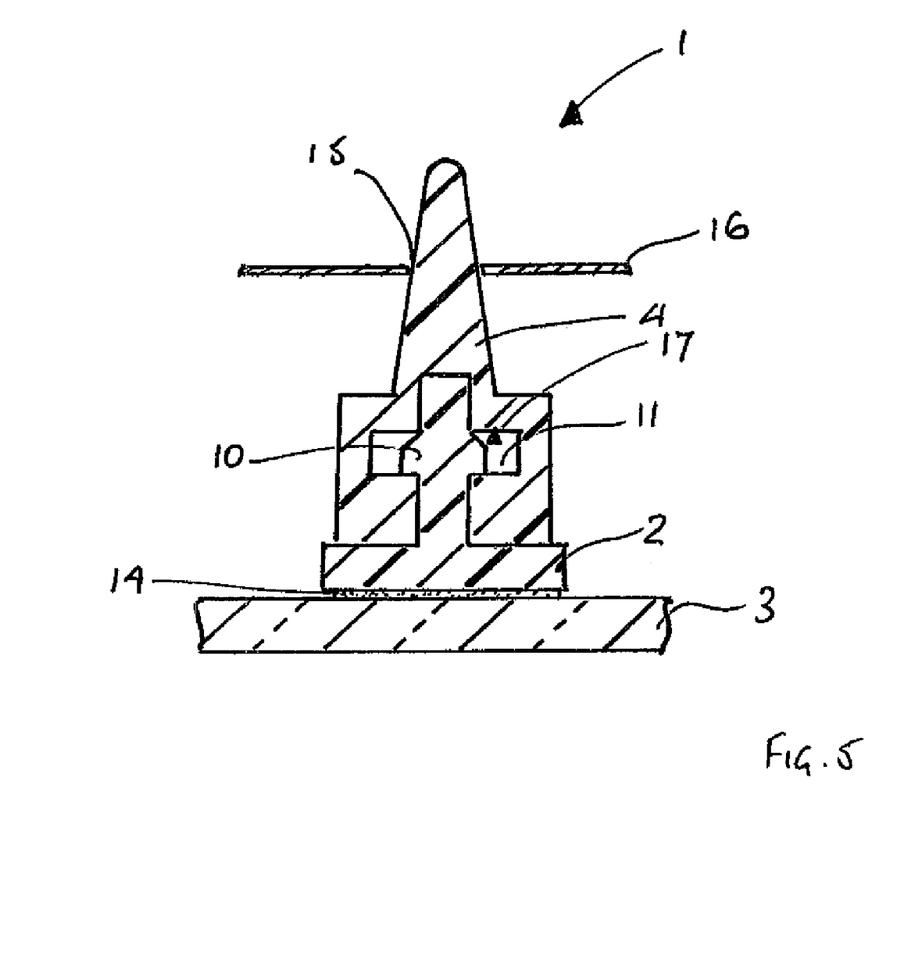
FIG. 5 is a schematic cross-section of the centring pin of FIG. 1 installed in a vehicle body.

FIG. 5 is a schematic cross-section of the centring pin of the invention installed in a vehicle body. This may be via a hole in the vehicle body, either in a central portion of the body or along an edge, such as in a flange. The cross-section of the pin itself is taken along line A-A' shown in FIG. 3, giving a view of the cuboid protrusions 10 and main body 12 of the base portion 2. The centring pin 1 is bonded to a ply of glass 3 by a layer of adhesive 14 that covers approximately the entire base portion 2 in contact with the glass 3. The centring portion 4 sits within a locating hole 15 in the vehicle bodywork 16, and is clipped around the base portion 2. The cuboid protrusions 10 are engaged in the square recesses 11 within the cavity 17, such that the centring pin 1 is locked into position.

When first assembled, the base portion 2, of the centring pin 1 is bonded to a surface of the glazing 3, and the centring portion 4 is clipped onto the base portion 2 in the lowered position. Once the adhesive used to bond the base portion 2 to the glazing 3 has cured, the glazing may be packed and shipped. On arrival at the vehicle manufacturer or glass installer, the centring pin 1 remains in the lowered position until the glazing is required for installation. At this point, whoever installs the glazing rotates the centring portion 4 of the centring pin 1 into the raised position, enabling the glazing 3 to be installed in the usual manner.

In the lowered position, the maximum height of the centring pin 1 is 10.4 mm, and in the raised position 17.4 mm, giving a space saving for a packed glazing of approximately 40%.

Figure 6A:
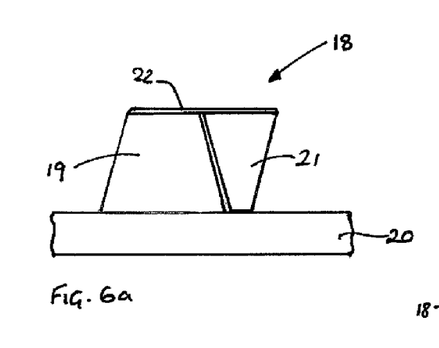
FIG. 6a shows a schematic side view of a second embodiment in accordance with the present invention in a lowered position.

Other designs of centring pin offering the same advantages as the pin 1 shown in FIGS. 1 to 5, but with additional functionality or cost benefit are shown in FIGS. 6a, b, c, 7a, 7b, 8a and 8b.

Figure 6B:
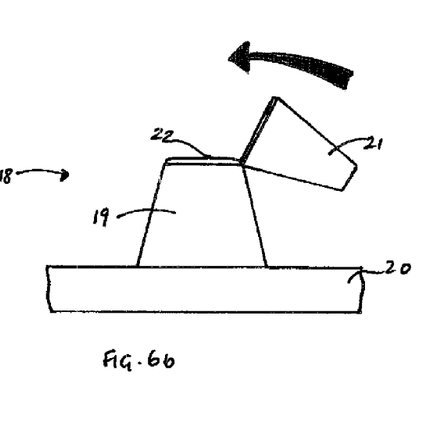
FIG. 6b shows a schematic side view of a second embodiment in accordance with the present invention between a lowered and a raised position.
Figure 6C:
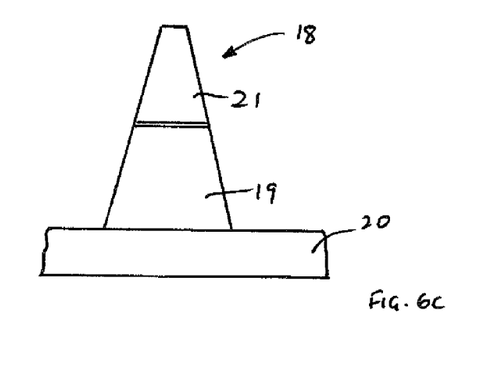
FIG. 6c shows a schematic side view of a second embodiment in accordance with the present invention in a raised position.

FIGS. 6a to 6c show a schematic side view of a second embodiment in accordance with the present invention. FIG. 6a shows a centring pin 18 in a lowered position, in which the glazing to which the pin is bonded may be stored. The pin 18 comprises a base portion 19, bonded to a glazing 20. A centring portion 21 is joined to the base portion 19 by a strip of flexible material 22. The strip 22 may be of the same material as the base portion 18 and/or the centring portion 21, or may be of a different material, for example, an adhesive tape. In order to move the centring portion 21 into a position in which the glazing 20 may be fitted into an aperture in a vehicle, the centring portion 21 is rotated. This is shown in FIG. 6b, where the direction of rotation is indicated by arrow A. FIG. 6c shows the centring pin 18 in its final, raised position, in which the glazing 20 may be fitted into an aperture in a vehicle. The centring portion 21 may engaged with the base portion 19. This may be by locking means, comprising protrusions on either the centring portion 21 or the base 19 that engage with corresponding recesses or holes in the other respective portion of the pin 18, or by means of an adhesive provided on the strip of flexible material 22.

FIGS. 7a, 7b, 8a and 8b show schematic cross-sectional views of centring pins in accordance with a third embodiment of the invention. Both centring pins shown have the additional advantage that the centring portion is extendible from the base portion. This offers various advantages, including increased space saving compared with the pins shown in FIGS. 1 to 6c, and enables additional spacing functionality to be incorporated into the pin, as described below.

Figure 7A:
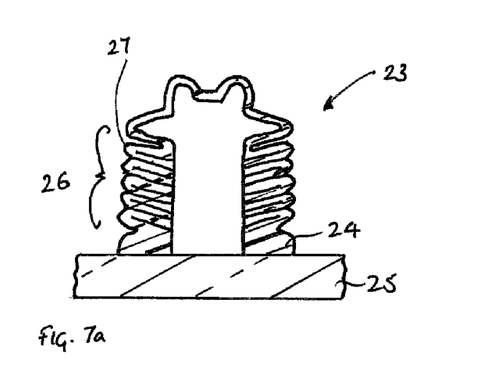
FIG. 7a shows a schematic cross-sectional view of a centring pin in accordance with a third embodiment of the invention in a lowered position.
Figure 7B:
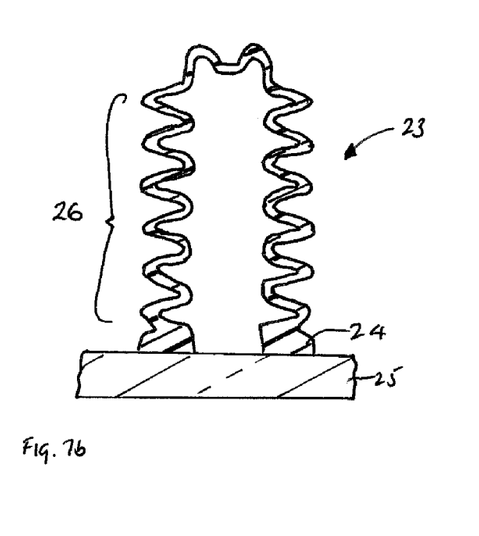
FIG. 7b shows a schematic cross-sectional view of a centring pin in accordance with a third embodiment of the invention in a raised position.

FIG. 7a shows a schematic cross-sectional view of a centring pin in accordance with a third embodiment of the invention in a lowered position, which a glazing may be stored. The centring pin 23 comprises a base portion 24, bonded to the surface of a glazing 25, and a centring portion 26, joined to the base portion 24. The base portion is rigid, and has fixed height and width dimensions. The centring portion 26 is formed from a flexible material and is extendible between a lowered and a raised position. In FIG. 7a, the centring pin 23 is in a lowered position, and the outer wall of the centring portion 26 is folded back upon itself in a series of concertina-like folds 27. FIG. 7b shows a schematic cross-sectional view of a centring pin in accordance with a third embodiment of the invention in a raised position In order to be able to fit the glazing 25 into an aperture in a vehicle, the centring pin 23 is moved into a raised position, by extending the centring portion 26, opening out the concertina-like folds 27 until the centring pin 23 reaches the size desired to enable the glazing to be fitted. The centring pin 23, when in the raised position, is of a generally truncated conical form, with the base portion 24 forming the base of the cone, and the centring portion 26 forming the upper portion of the cone. However, other similar forms, such as cylinders, cones, square and triangular-based pyramids may be used instead.

Figure 8A:
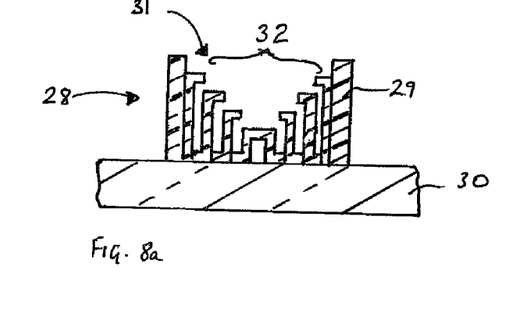
FIG. 8a shows a schematic cross-sectional view of a second centring pin in accordance with a third embodiment of the invention in a lowered position.
Figure 8B:
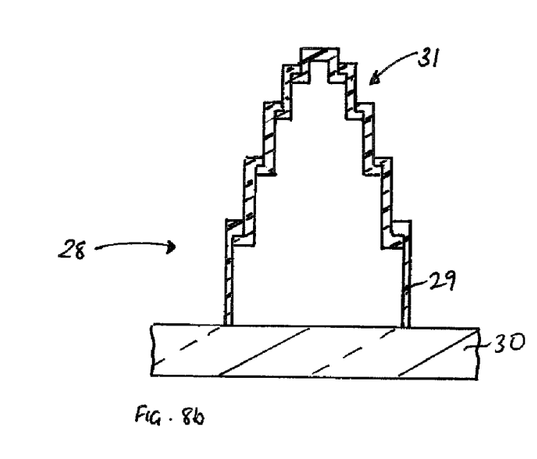
FIG. 8b shows a schematic cross-sectional view of a second centring pin in accordance with a third embodiment of the invention in a raised position.

FIG. 8a shows a schematic cross-sectional view of a second centring pin in accordance with a third embodiment of the invention in a lowered position. The centring pin 28 comprises a base portion 29, bonded to the surface of a glazing 30, and a centring portion 31, joined to the base portion 29. The centring portion 31 comprises a plurality of concentric body portions 32 arranged to fit inside each other, and inside the base portion 29. The body portions may interlock (as shown in FIG. 8b) or may be joined by a flexible material. FIG. 8b shows a schematic cross-sectional view of a second centring pin in accordance with a third embodiment of the invention in a raised position. In order to place the centring pin 32 into a raised position, the concentric body portions 32 are lifted out of the base portion, extending the centring portion 31, with each concentric body portion 32 interlocking with the adjacent portion until finally all of the portions are interlocked. The centring pin 32 is then in the raised position, in which the glazing 30 may be fitted into an aperture in a vehicle.

One further advantage of using extendible centring portions 26, 31, is that an additional spacing function can be provided using the centring pin 23, 28. One issue when fitting a glazing into an aperture in a vehicle is ensuring that the glazing is contacted sufficiently with the adhesive bonding the glazing into the aperture. This may be achieved by using a spacer placed within a profiled gasket positioned around the periphery of the glazing. However, if the centring pins shown in and described in relation to FIGS. 7a, 7b, 8a and 8b above are used, the extendible centring portions 26, 31 may be adapted to collapse when reaching a stop point on the vehicle body. This is illustrated in FIG. 9.

Figure 9:
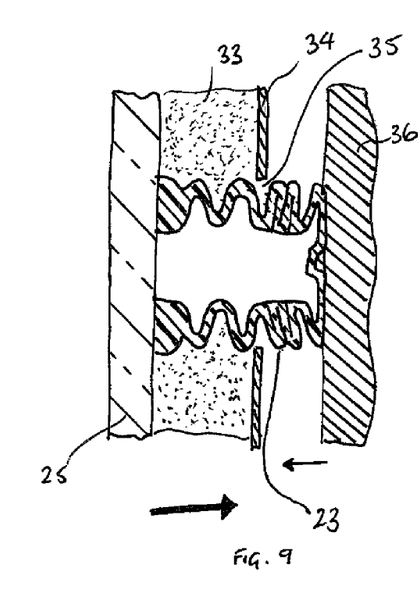
FIG. 9 is a schematic cross-sectional drawing of the centring pin shown in FIGS. 7a and 7b, during fitting of the glazing into an aperture in a vehicle body The present invention provides a centring pin that, when bonded to the surface of a glazing, is able to rotate between a lowered position (for use during transportation or storage) and a raised position (for use in fitting a glazing into a vehicle aperture).

FIG. 9 is a schematic cross-sectional drawing of the centring pin 23 shown in FIGS. 7a and 7b, during fitting of the glazing 25 into an aperture in a vehicle body. The glazing 25 is pushed against a layer of adhesive 33 (indicated by direction arrow B) positioned along a flange 34 running around the aperture in the vehicle body. The centring pin 23 is inserted into a hole 35 in the flange 34, and the glazing pushed until the tip of the centring portion 26 touches the vehicle body 36 behind the flange 34. At this point, the glazing 25 may be pushed further against the flange 34, until the tip of the centring portion 26 collapses back on itself, causing re-folding of a number of the concertina-like folds 27. When a predetermined distance has been reached (where the glazing 25 is fully in contact with the adhesive) the centring portion 26 collapses no further, and the operative fitting the glazing 25 becomes aware of a resistive force against the direction of push (shown by direction arrow C), and stops pushing, with the glazing 25 is in the correct position. The centring portion 26 may be provided with stop means, enabling a section of the centring portion 26 to collapse, for example, a reinforced region.

The centring pins described above are suitable for use with both single-ply, laminated (two plies of glass having a ply of an interlayer laminated therebetween) and bi-layer (single-ply glass and plastic film laminate) glazings that are used as fixed vehicle glazings such as windscreens, sidelights and backlights. The centring pin may have functionality in addition to centring, for example, a hook may be provided on the centring portion, preventing removal of the centring pin from the hole in the vehicle body work into which it has been inserted. In addition, the centring pins described above are also suitable for use with various vehicle panels and parts, such as such as trims and covers, undertrays, body panels, instrument clusters, lamps, shields, guards and aesthetic finishers.

Suitable adhesives for bonding the centring pin to the surface of a glazing include self-adhesive tape, polyurethane and hot melt adhesives and ultra-violet curing adhesives. Alternatively, the centring pins may be included within a mould in an injection moulding process, and encapsulated within a profiled gasket formed at the periphery of the glazing, or included with another component fixed to the glazing. The centring pin is preferably formed of a thermoplastic polymer, such as but not limited to polypropylene, polyamide, glass-fibre reinforced polyamide or polyoxymethylene.

The invention claimed is:

1. Vehicle glazing having a centring pin bonded thereto, the centring pin comprising a base portion bonded to the vehicle glazing and a centring portion adapted to be inserted into a hole in the bodywork of a vehicle, the centring portion being joined to the base portion, and moveable between a lowered position, in which the glazing may be stored, and a raised position, in which the glazing may be fitted into an aperture in a vehicle.

2. Vehicle glazing according to claim 1, wherein the centring portion of the centring pin is rotatably mounted on the base portion by means of a pivot, and wherein in the lowered position, the centring portion is substantially parallel with the base portion and in the raised position the centring portion is substantially perpendicular to the base portion.

3. Vehicle glazing according to claim 2, wherein the base portion and the centring portion of the centring pin comprise locking means that act to lock the centring portion into the raised position.

4. Vehicle glazing according to claim 3, wherein the locking means comprise a pair of opposing cuboid protrusions on the base portion adapted to engage with corresponding square recesses on the centring portion.

5. Vehicle glazing according to claim 2, wherein the centring portion of the centring pin comprises a cavity having two side walls in the base of the centring portion sized to receive and overlap the base portion.

6. Vehicle glazing according to claim 5, wherein the pivot comprises opposing circular holes in the side walls of the cavity each having a cylindrical protrusion on the base portion inserted therein.

7. Vehicle glazing according to claim 1, wherein the base portion and the centring portion of the centring pin are joined by a strip of flexible material.

8. Vehicle glazing according to claim 7, wherein, when in the raised position, the centring portion and the base portion of the centring pin form a truncated cone, with the base portion forming the base of the cone and the centring portion forming the upper portion of the cone.

9. Vehicle glazing according to claim 7, wherein, in the raised position, the centring portion of the centring pin engages with the base portion.

10. Vehicle glazing according to claim 1, wherein the centring portion of the centring pin is extendible above the base portion to move between the lowered position and the raised position.

11. Vehicle glazing according to claim 10, wherein the centring portion of the centring pin is formed from a flexible material folded back upon itself in a plurality of concertina-like folds in the lowered position.

12. Vehicle glazing according to claim 10, wherein the centring portion of the centring pin is formed from a plurality of concentric body portions, arranged to fit inside each other and the base portion of the centring pin in the lowered position.

13. Vehicle glazing according to claim 10, wherein the centring portion of the centring pin is provided with a stop region enabling a section of the centring portion to collapse when inserted into a hole in the bodywork of a vehicle.

14. Vehicle glazing according to claim 1, wherein both the base portion and the centring portion of the centring pin are formed from a thermoplastic material.

15. Vehicle glazing according to claim 14, wherein the thermoplastic material is one of polypropylene polyamide, glass-fibre reinforced polyamide or polyoxymethylene.

16. Centring pin, suitable for bonding to a vehicle glazing, comprising:
a base portion for bonding to the glazing; and
a centring portion adapted to be inserted into a hole in a bodywork of a vehicle when in a raised position, the centring portion being joined to the base portion,
wherein the centring portion is moveable between a lowered position for transportation or storage and the raised position for fitting the glazing into a vehicle aperture, and
wherein the base portion and the centring portion comprise locking means that act to lock the centring portion in the raised position.

17. Centring pin according to claim 16, wherein the centring portion is rotatably mounted on the base portion by means of a pivot, and wherein in the lowered position, the centring portion is substantially parallel with the base portion and in the raised position the centring portion is substantially perpendicular to the base portion.

18. Centring pin according to claim 17, wherein the locking means comprise a pair of opposing cuboid protrusions on the base portion adapted to engage with corresponding square recesses on the centring portion.

19. Centring pin according to claim 17, wherein the centring portion comprises a cavity having two side walls in the base of the centring portion sized to receive and overlap the base portion.

20. Centring pin according to claim 19, wherein the pivot comprises opposing circular holes in the side walls of the cavity each having a cylindrical protrusion on the base portion inserted therein.

21. Centring pin according to claim 16, wherein the base portion and the centring portion are joined by a strip of flexible material.

22. Centring pin according to claim 21, wherein, when in the raised position, the centring portion and the base portion form a truncated cone, with the base portion forming the base of the cone and the centring portion forming the upper portion of the cone.

23. Centring pin according to claim 21, wherein, in the raised position, the centring portion engages with the base portion.

24. Centring pin according to claim 16, wherein the centring portion is extendible above the base portion to move between the lowered position and the raised position.

25. Centring pin according to claim 24, wherein the centring portion is formed from a flexible material folded back upon itself in a plurality of concertina-like folds in the lowered position.

26. Centring pin according to claim 25, wherein the centring portion is formed from a plurality of concentric body portions, arranged to fit inside each other and the base portion of the centring pin in the lowered position.

27. Centring pin according to claim 24, wherein the centring portion is provided with a stop region enabling a section of the centring portion to collapse when inserted into a hole in the bodywork of a vehicle.

28. Centring pin according to claim 16, wherein both the base portion and the centring portion are formed from a thermoplastic material.

29. Centring pin according to claim 28, wherein the thermoplastic material is one of polypropylene polyamide, glass-fibre reinforced polyamide or polyoxymethylene.

30. Centring pin bondable to a glazing of a vehicle comprising:

a base portion configured to be bonded to the glazing;

a centring portion connected to the base portion and configured to be inserted into a hole in a bodywork of the vehicle, the centring pin being movable relative to the base portion between a lowered position for transportation or storage and a raised position in which a free end portion of the centring portion is spaced further from the base portion than in the lowered portion for fitting the glazing into a vehicle aperture; and the base portion comprising a first locking portion and the centring portion comprising a second locking portion, the first locking portion and the second locking portion engaging one another when the centring portion is in the raised position to lock the centring portion in the raised position relative to the base portion.

31. Centring pin according to claim 30, wherein one of the first locking portion and the second locking portion includes a protrusion and the other of the first locking portion and the second locking portion includes a recess, the protrusion being positioned in the recess in the raised position of the centring pin and the protrusion being spaced from the recess in the lowered position of the centring pin.

* * * * *